United States Patent [19]

Butenko et al.

[11] Patent Number: 4,611,304
[45] Date of Patent: Sep. 9, 1986

[54] TRANSDUCER MEMORY CIRCUIT

[75] Inventors: R. Bruce Butenko, Bellevue; Randall B. Sprague, Redmond; Charles D. Bateman, Bellevue, all of Wash.

[73] Assignee: Sundstrand Data Control, Inc., Redmond, Wash.

[21] Appl. No.: 517,877

[22] Filed: Jul. 27, 1983

[51] Int. Cl.$^4$ .................. G06F 15/20; G06F 11/30; G01P 15/13

[52] U.S. Cl. .................. 364/571; 364/506; 364/508; 364/566

[58] Field of Search ............ 364/481, 556, 571, 573, 364/900, 506, 508, 571, 566

[56] References Cited

U.S. PATENT DOCUMENTS

| | | | |
|---|---|---|---|
| 3,702,073 | 11/1972 | Jacobs | 73/517 B |
| 4,094,199 | 6/1978 | Holdren et al. | 364/566 X |
| 4,102,202 | 7/1978 | Ferriss | 364/566 X |
| 4,135,548 | 1/1979 | Sears | 73/304 R X |
| 4,155,257 | 5/1979 | Wittke | 73/517 R X |
| 4,161,700 | 7/1979 | Fujikata et al. | 364/571 X |
| 4,282,578 | 8/1981 | Payne et al. | 364/573 |
| 4,303,984 | 12/1981 | Houvig | 364/571 |
| 4,312,042 | 1/1982 | Bateman | 364/463 |
| 4,336,718 | 6/1982 | Washburn | 364/566 X |
| 4,418,392 | 11/1983 | Hata | 364/571 |
| 4,423,408 | 12/1983 | Place | 364/571 X |
| 4,481,596 | 11/1984 | Townzen | 364/571 |

Primary Examiner—Felix D. Gruber
Assistant Examiner—Edward R. Cosimano
Attorney, Agent, or Firm—James A. Gabala; Ted E. Killingsworth; Harold A. Williamson

[57] ABSTRACT

In order to facilitate the installation of transducers such as accelerometers in a larger system, each transducer is provided with a memory circuit which is physically attached to the transducer and contains data reflecting the operating characteristics of that particular transducer. The data stored in the memory can be in the form of coefficients for polynomial equations that describe the operation of the transducer as the function of a variable such as temperature. Provision is made for transmitting this data along with the signal output from the transducer to the larger system.

4 Claims, 4 Drawing Figures

TRANSDUCER MEMORY CIRCUIT

TECHNICAL FIELD

The invention relates to the field of transducer data transmission circuits and more particularly to circuits for providing an indication of transducer operating characteristics.

BACKGROUND OF THE INVENTION

In certain prior art systems that receive information from transducers such as the aircraft weight and balance system disclosed in Bateman, U.S. Pat. No. 4,312,042, operation of the transducers is modeled on temperature. Since each individual transducer has a slightly different response to temperature, it is necessary in order to optimize the accuracy of the signals received from the transducer to compensate each transducer's output signal for temperature. This is typically done by utilizing a fourth order polynomial. Before the transducer is installed, its operation is tested over a temperature range and by means of curve fitting techniques the coefficients for a fourth order polynomial describing its operation as a function of temperature are determined.

In prior art systems the normal procedure is to place the polynomial coefficients in the memory of the system computer usually at the time the transducers are installed in the system. However, this procedure has a number of disadvantages including the requirement that the coefficients in the computer memory be changed each time a transducer is replaced. Also, since in many cases it is necessary to enter the data manually, errors can arise in inputting the coefficients into the memory.

SUMMARY OF THE INVENTION

It is therefore an object of the invention to provide a memory circuit to be secured to a transducer for storing data representing the operating characteristics of the transducer. Another feature of the invention is the provision of a light emitting diode on the transducer, responsive to a fault signal from a system computer, to give a visual indication of a faulty transducer.

It is an additional object of the invention to provide a memory circuit for use with a transducer operatively connected to a control system wherein the transducer is configured to transmit an output signal representing a physical quantity measured by the transducer to the control system, wherein the memory circuit includes: a mechanism for securing the memory circuit to the transducer; a memory for storing data representing operating characteristics of the transducer; a circuit for accessing predetermined elements of the data from the memory; and a circuit for transmitting this data to the control system. The memory can also include data identifying the transducer such as the part number or serial numbers along with a check sum to aid in verifying the accurate transmission of data from the memory to the central system.

It is a further object of the invention to provide in an aircraft weight and balance system having a plurality of transducers secured to the landing gear and connected to a central computer, a memory circuit for each transducer including: a mechanism for securing the memory circuit to the transducer; a read only memory containing transducer temperature related operating data; an access circuit for selecting predetermined elements of the data; and a transmission circuit for transmitting the selected data to the central computer. The memory circuit can also include means for transmitting temperature data from the transducer to the central system along with the operating data.

DETAILED DESCRIPTION OF THE INVENTION

Figure 1:
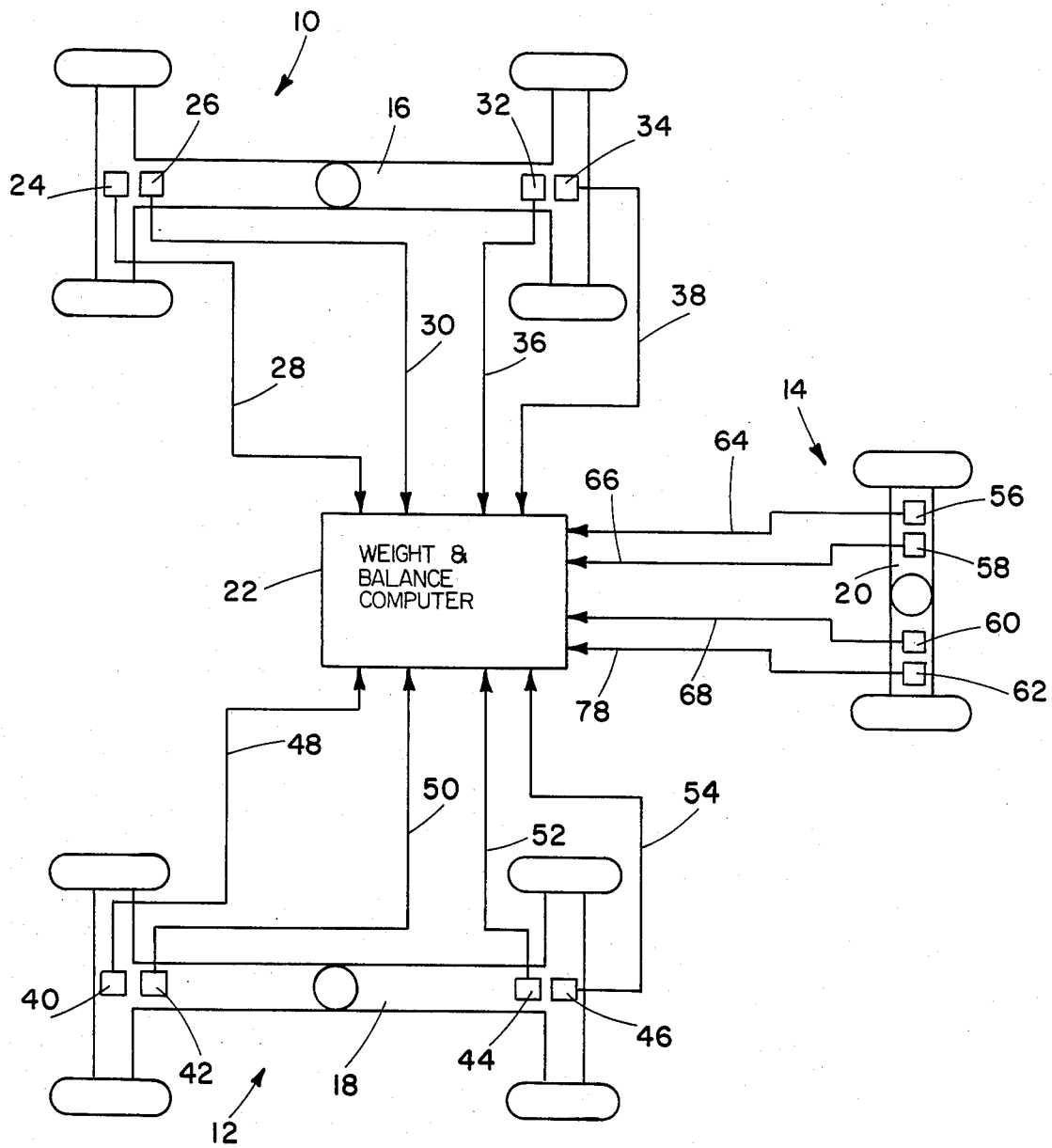
FIG. 1 is a diagrammatic plan view of an aircraft landing gear with a weight and balance system installed.

An environment for the invention is illustrated by the aircraft weight and balance system in FIG. 1. As shown in FIG. 1 the weight and balance system is installed on a pair of main landing gear shown generally at 10 and 12 and a nose gear at 14. An indication of aircraft weight is provided by measuring the deflections of main gear bogie beams 16 and 18 and nose gear axle 20 by accelerometers. A detailed explanation of the procedure for determining aircraft weight and balance using accelerometers is provided in Bateman, U.S. Pat. No. 4,312,042. Unlike the single channel system disclosed in Bateman, the system shown in FIG. 1 is a dual channel system. This means that there are two accelerometers in each location to provide redundant information to a weight and balance computer 22. For example there are two accelerometers 24 and 26 on the left portion of bogie beam 16 connected to the computer 22 by means of lines 28 and 30 respectively. Dual redundant accelerometers 32 and 34 connected by lines 36 and 38 to the computer 22 are located on the other end of bogie beam 16. In a similar manner accelerometers 40, 42, 44 and 46 measure the deflection of the bogie beam 18 and provide inclination signals to the computer 22 over lines 48, 50, 52 and 54. The deflection of the nose wheel axle 20 is measured by four accelerometers 56, 58, 60 and 62 that transmit inclination signals over lines 64, 66, 68 and 70 to the computer 22. It should be noted that although in FIG. 1 signals are being represented as being transmitted to the computer 22 from the accelerometers by means of one line, there are usually a number of other lines associated with each accelerometer that transmit other signals such as temperature and self test as well as power supply voltages. These additional lines will be discussed in connection with FIG. 3.

Figure 2:
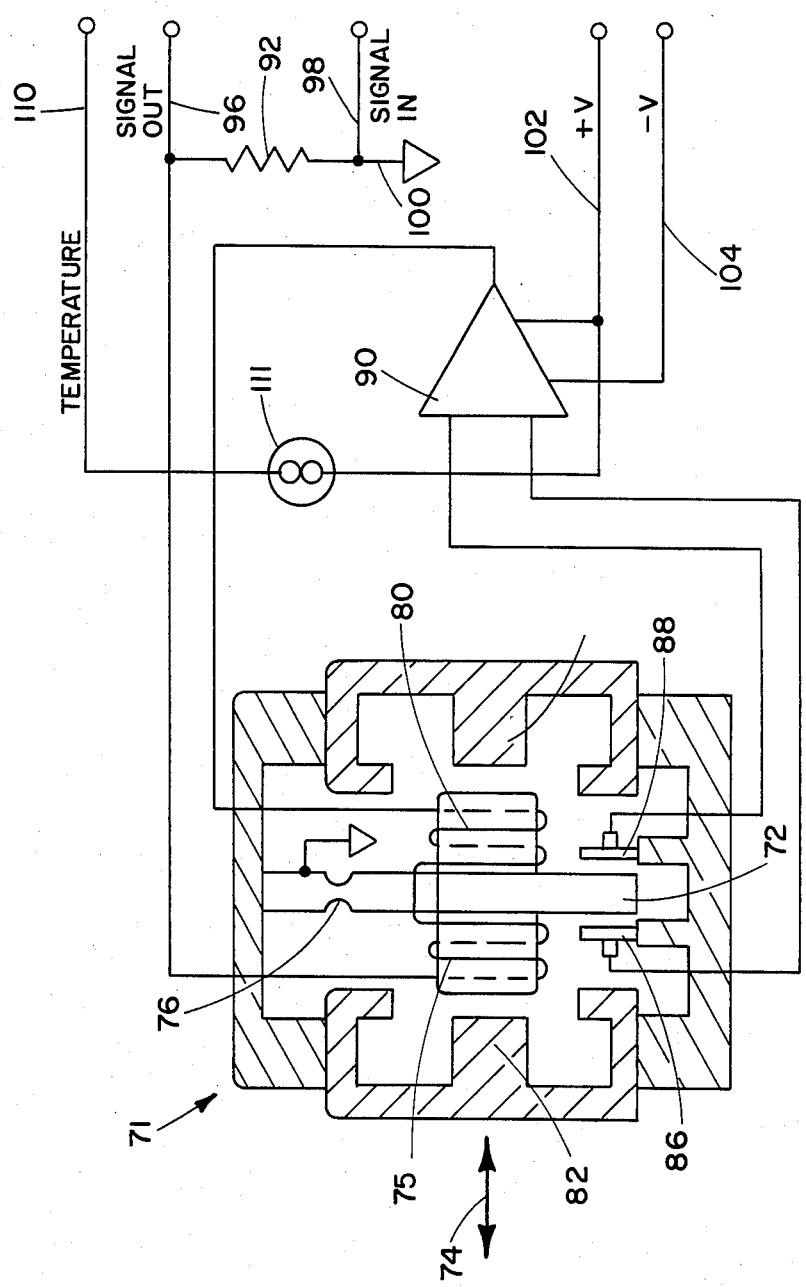
FIG. 2 is a sectioned view and schematic of a servoed accelerometer transducer.

In FIG. 2 is illustrated a servoed pendulous accelerometer 71 that serves as the transducer in the weight and balance system and corresponds to accelerometers identified in FIG. 1. A pendulously supported proof mass 72 moves with respect to the sensitive axis 74 about a flexure hinge 76. A pair of coils 75 and 80 interact with magnetic fields produced by magnets 82 and 84 to produce a force on the proof mass 72 to counteract the changes in the capacitances of a pair of pick-off capacitors 86 and 88 as measured by an amplifier 90. This amplifier generates a restoring current in coils 78 and 80 which is converted into a voltage output signal by a resistor 92. The basic structure of this type of accelerometer is disclosed in U.S. Pat. No. 3,702,073.

Figure 3:
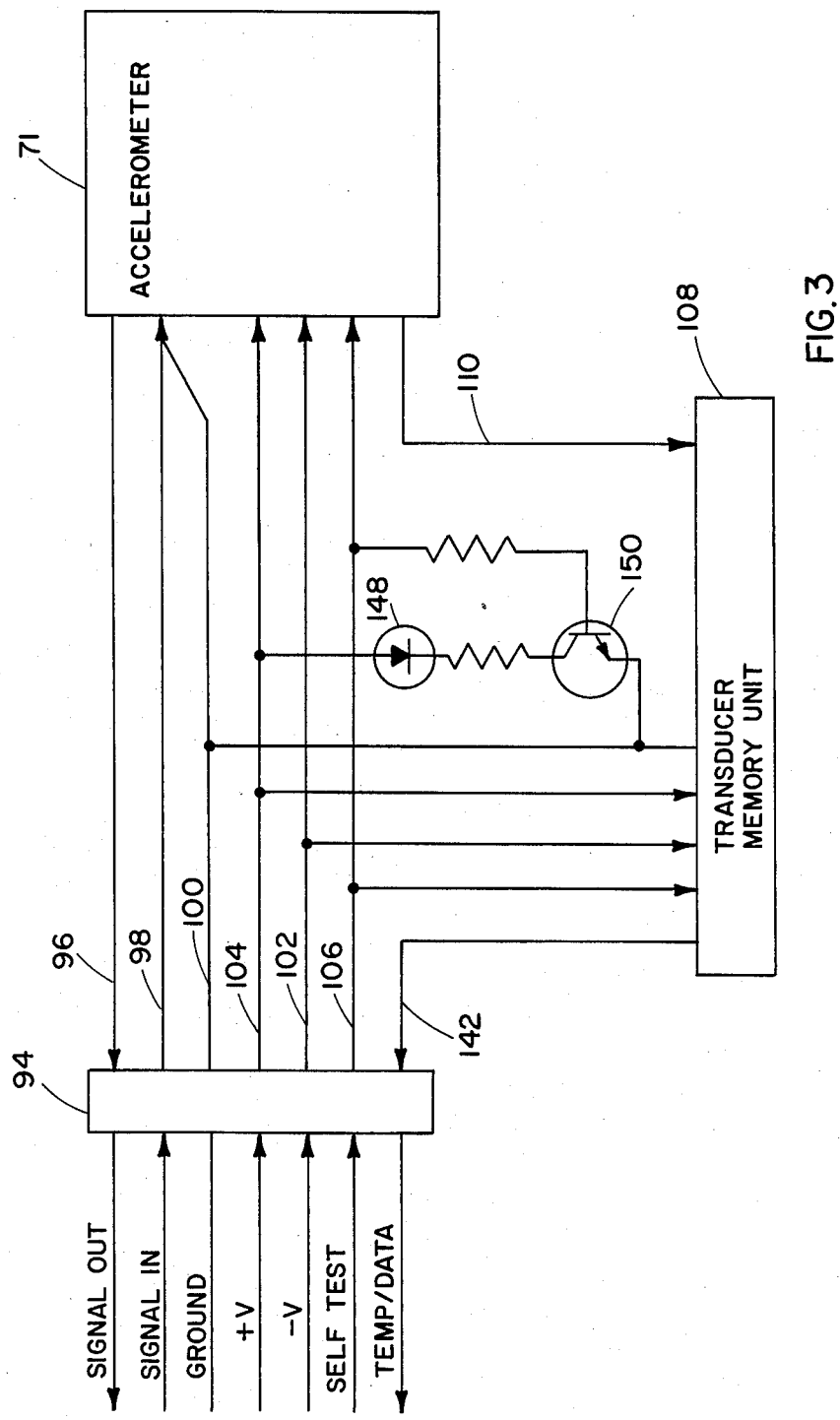
FIG. 3 is a block diagram of an accelerometer connected to a transducer memory.

An overall block diagram of the preferred embodiment of the invention is shown in FIG. 3. Indicated at block 71 is the accelerometer of FIG. 2. A connector 94 is attached to the accelerometer 71 and electrical connections are provided by a series of lines including a signal output line 96, a signal input line 98, a ground line 100, a pair of power supply lines 102 and 104 and a self-test line 106. Physically connected to and associated with the accelerometer is a transducer memory unit 108. One input to the memory unit 108 is a temperature line 110 from a temperature sensor 111 associated with the accelerometer electronics 90 of FIG. 2. This is normally an analog current signal representing the internal temperature of the accelerometer 71.

Figure 4:
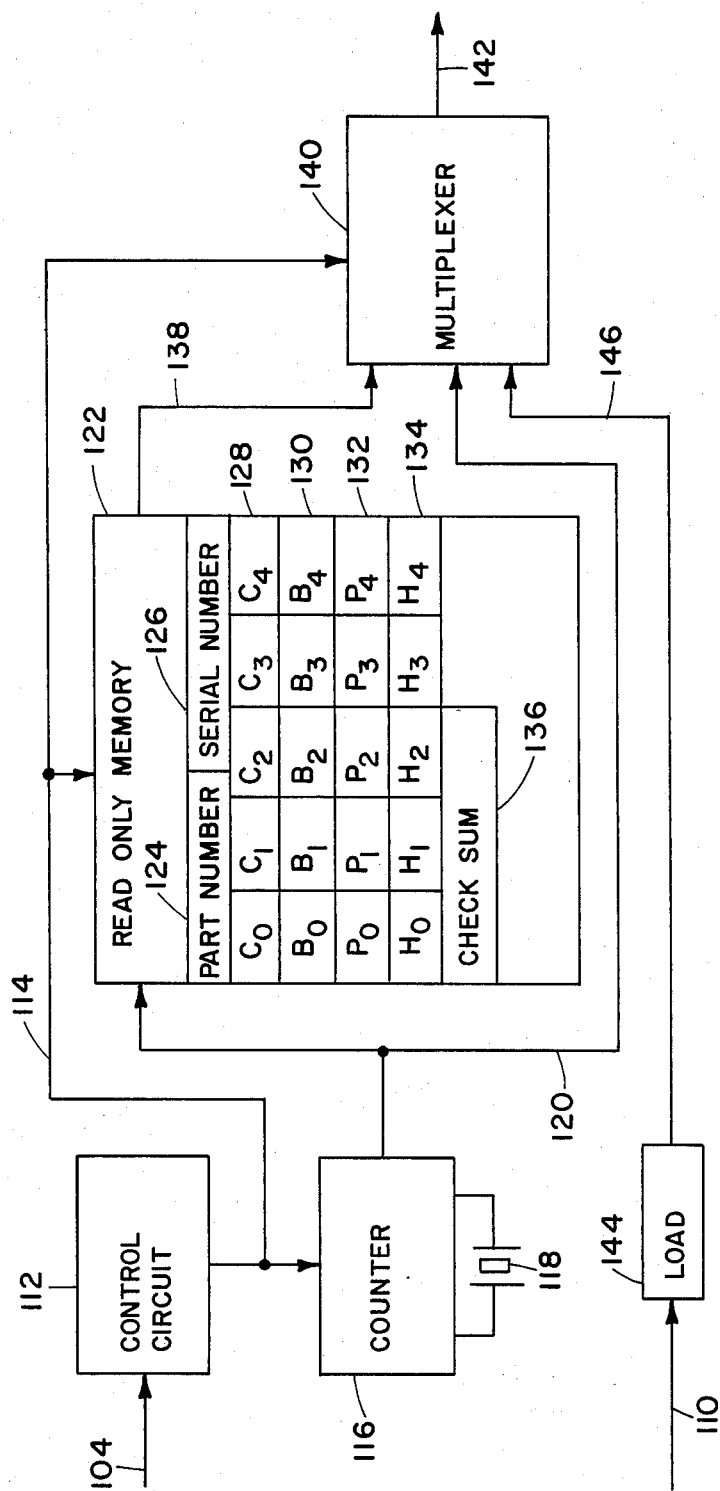
FIG. 4 is a block diagram of the transducer memory of FIG. 3.

A block diagram of the transducer memory unit 108 is provided in FIG. 4. Operation of the transducer memory unit 108 is initiated by a control circuit 112 which respond to a self-test signal from the computer 22 on line 104. Self-testing is a commonly used technique in electronic system for exercising the internal logic of the system to determine if there are any faults. In weight and balance systems of the type disclosed, a self-test signal, which initiates the self-test cycle in the overall system, is generated usually during power up of the system or before an auto zero cycle. In the preferred embodiment of the invention, the self-test signal on line 104 causes the control circuit 112, which can be a switch, to place a logic signal on a line 114.

A counter 116, having an external crystal 118 responds to the logic signal on line 114 by generating a series of addresses on a line 120.

The addresses generated on line 120 correspond to data locations in a programmable read only memory (PROM) 122. It is in the PROM 122 that the data representing the characteristics of the particular accelerometer 71 are stored. In the preferred embodiment of the invention, the part number of the accelerometer 71 is stored as shown in FIG. 4 in a location represented at 124 as well as the serial number for that particular accelerometer in a location represented at 126.

In addition to the part and serial numbers, the PROM 122 also stores data representing the operational characteristics of the accelerometer 71. The accuracy of accelerometers as well as many other types of transducers is affected by the internal temperature of the instrument. Output of the accelerometer is therefore temperature related and can conveniently be approximated by fourth order polynomials of the following type where t represents temperature:

$$\text{Scale Factor} = C_0 + C_1 t + C_2 t^2 + C_3 t^3 + C_4 t^4 \quad (1)$$

$$\text{Bias} = B_0 + B_1 t + B_2 t^2 + B_3 t^3 + B_4 t^4 \quad (2)$$

$$\text{Pendulum Axis Alignment} = P_0 + P_1 t + P_2 t^2 + P_3 t^3 + P_4 t^4 \quad (3)$$

$$\text{Hinge Axis Alignment} = H_0 + H_1 t + H_2 t^2 + H_3 t^3 + H_4 t^4 \quad (4)$$

Scale factor and bias represent electrical characteristics of the accelerometer and pendulous axis alignment and hinge axis alignment represent mechanical characteristics of the accelerometer that can vary with temperature. Pendulous axis alignment can change when the alignment of the pendulum or proof mass 72 of the accelerometer moves with respect to the sensitive axis 74 in response to temperature variations. The effect of pendulous axis alignment on the output of the accelerometer 71 can be modeled or approximated by equation (3). The coefficients $P_0$, $P_1$, $P_2$, $P_3$, and $P_4$ of equation (3) are typically obtained by testing the particular accelerometer. Similarly the coefficients $H_0$, $H_1$, $H_2$, $H_3$ and $H_4$ for equation (4) which approximates the changes in the output of the accelerometer 71 due to temperature effects on the hinge axis alignment, which extends out of the paper at the hinge 76, can be obtained by testing. The scale factor equation (1) coefficients $C_0$, $C_1$, $C_2$, $C_3$ and $C_4$ along with the bias equation (2) coefficients $B_0$, $B_1$, $B_2$, $B_3$ and $B_4$ can be obtained the same way. These coefficients are stored in memory locations 128, 130, 132 and 134 as shown in FIG. 4.

Also included in the PROM is a check sum at 136. Preferably the check sum 136 represents the sum of all the data stored in the PROM 122.

The counter 116 generates the sequential addresses of the data stored in the PROM 122 resulting in that data being read out on a line 138. The logic signal on line 114 serves to enable the PROM 122 thus permitting the data to be read out. A multiplexer 140 receives the data in bit serial form from the PROM 122 over line 138 after being enabled by the logic signal on line 114 and transmits it over an output line 142 to the connector 94. The multiplexer 140 can also receive an input over 120 which can in effect select the internal location in the PROM 122 from which data is received.

During the normal operation of the accelerometer, the current signal on line 110 representing the internal temperature of the accelerometer 71 is converted by a resistive load 144 to a voltage signal which in turn is applied by line 46 to the multiplexer 140. When the logic signal on line 114 is not present, the multiplexer will transmit the voltage signal on line 146 to the connector 94 over line 142. Thus the line 142 serves to both transmit the analog temperature signal and the digital characterization data to the computer 22.

Another feature of the invention is the provision for an indicator light on the accelerometer to give maintenance personnel an indication as to which accelerometer has failed a self test. As shown in FIG. 3 a light emitting diode 148 is connected across the positive voltage +V on line 104 and a transistor 150. When a fault is detected in the accelerometer by the computer 22, a signal is applied to the self-test line 106 by the computer 22 which has the effect of turning on transistor 150 thus allowing current to flow through the light emitting diode 148. This feature can be very useful in dual channel type systems as illustrated in FIG. 1 where two accelerometers are mounted side by side.

We claim:

1. A memory circuit for use with an accelerometer connected to a control system wherein the accelerometer is configured to transmit an output signal representing a physical quality measured by the accelerometer to the control system, said accelerometer including a proof mass supported on a pendulum by means of a hinge, the memory circuit comprising:

means for securing said memory circuit to the accelerometer;

a memory for storing data representing characteristics of the accelerometer including identity, pendulum axis alignment data, hinge axis alignment data, scale factor data and bias data, said data being stored in said memory in the form of polynominal coefficients;

access means, connected to said memory, for selectively accessing predetermined elements of said characteristic data, said access means including a control circuit connected to the control system and a counter connected to said memory and said control circuit to access said predetermined elements in said memory in response to a control signal from said control circuit;

transmission means, connected to said access means, for transmitting said predetermined elements of characteristic data to the control system, said transmission means including means for transmitting temperature data from a temperature sensor in said the accelerometer to the control system and including a multiplexer circuit for transmitting said characteristic data and said temperature data to the control system; and indicator means, responsive to a fault signal from the control system, for producing a visible indication on the accelerometer of a fault in the accelerometer in the event that said predetermined elements fail to be transmitted to said control system in response to said access means.

2. The memory circuit of claim 1 wherein said memory includes an electronic read only memory.

3. The memory of claim 1 wherein said indicator means includes a light emitting diode.

4. In an aircraft weight and balance system having a plurality of uniquely identifiable accelerometer transducers secured to the landing gear and connected to a control computer which has been programmed to provide a self-test signal, a memory circuit for each accelerometer transducer comprising:

means for securing said memory circuit to the transducer;

an electronic memory containing data elements representing the operating characteristics of the accelerometer transducer as a function of temperature in the form of polynominal coefficients and representing the identity of the accelerometer transducer;

access means, connected to said electronic memory, for selectively accessing predetermined data elements, said access means including a counter for addressing said electronic memory, said counter being operated in response to the self-test signal from the control computer;

transmission means and a temperature sensor, connected to said access means, for transmitting said predetermined data elements and temperature data to the control computer and;

a light producing indicator responsive to a fault signal from the control computer, said fault signal being produced in the event that said control computer fails to receive said predetermined data elements in response to the self-test signal.

* * * * *